US012574284B2

(12) United States Patent
Gruber

(10) Patent No.: US 12,574,284 B2
(45) Date of Patent: Mar. 10, 2026

(54) UNIVERSAL NETWORK LANGUAGE MODEL WITH API INTERFACE FOR CROSS-PLATFORM SUPPORT AND LOG SUMMARIZATION

(71) Applicant: CDW LLC, Vernon Hills, IL (US)

(72) Inventor: Carl Gruber, Fond du Lac, WI (US)

(73) Assignee: CDW LLC, Vernon Hills, IL (US)

( * ) Notice: Subject to any disclaimer, the term of this patent is extended or adjusted under 35 U.S.C. 154(b) by 61 days.

(21) Appl. No.: 18/771,762

(22) Filed: Jul. 12, 2024

(65) Prior Publication Data

US 2026/0019325 A1 Jan. 15, 2026

(51) Int. Cl.
H04L 41/069 (2022.01)
G06F 16/34 (2019.01)

(52) U.S. Cl.
CPC .......... H04L 41/069 (2013.01); G06F 16/345 (2019.01)

(58) Field of Classification Search
CPC ..... H04L 41/069; G06F 16/345; G06N 20/00; G06N 5/022; G06N 3/0464
See application file for complete search history.

(56) References Cited

U.S. PATENT DOCUMENTS

| | | | | |
|---|---|---|---|---|
| 2008/0189400 | A1 * | 8/2008 | Norrie ..................... | H04L 41/14 |
| | | | | 709/223 |
| 2014/0189435 | A1 * | 7/2014 | Manuel-Devadoss ....................... | |
| | | | | G06F 11/3452 |
| | | | | 714/43 |

| | | | | |
|---|---|---|---|---|
| 2015/0058195 | A1 * | 2/2015 | Comly ................... | G06Q 40/04 |
| | | | | 705/37 |
| 2017/0295205 | A1 * | 10/2017 | Kwon ..................... | H04L 63/10 |
| 2020/0204452 | A1 | 6/2020 | Bhat et al. | |
| 2022/0239569 | A1 | 7/2022 | Wu et al. | |
| 2023/0133057 | A1 * | 5/2023 | Murthy ................... | G06N 3/04 |
| | | | | 709/220 |
| 2023/0408421 | A1 * | 12/2023 | Amerson ........... | G01N 21/8901 |
| 2024/0303336 | A1 * | 9/2024 | Tammireddy ....... | H04L 63/1408 |
| 2024/0314020 | A1 * | 9/2024 | Gong .................... | H04L 41/069 |
| 2025/0077568 | A1 * | 3/2025 | Chakiat ............... | H04N 21/251 |
| 2025/0300914 | A1 * | 9/2025 | Parla .................... | H04L 43/028 |
| 2025/0310204 | A1 * | 10/2025 | Dhanakshirur ......... | H04L 41/16 |

OTHER PUBLICATIONS

International Application No. PCT/US2025/037220, International Search Report and Written Opinion, mailed Nov. 20, 2025.

* cited by examiner

*Primary Examiner* — Muhammad Raza
(74) *Attorney, Agent, or Firm* — MARSHALL, GERSTEIN & BORUN LLP

(57) ABSTRACT

A computing system for cross-platform support and log summarization includes a language model, APIs, processors, and memories to generate queries and troubleshooting steps from log files and IR system results. A method involves obtaining log files, generating IR system queries, and creating troubleshooting steps using a language model. A non-transitory computer readable medium contains instructions for obtaining log files, generating queries, and creating troubleshooting steps based on log files and IR results.

13 Claims, 9 Drawing Sheets

200

Figure 3A:
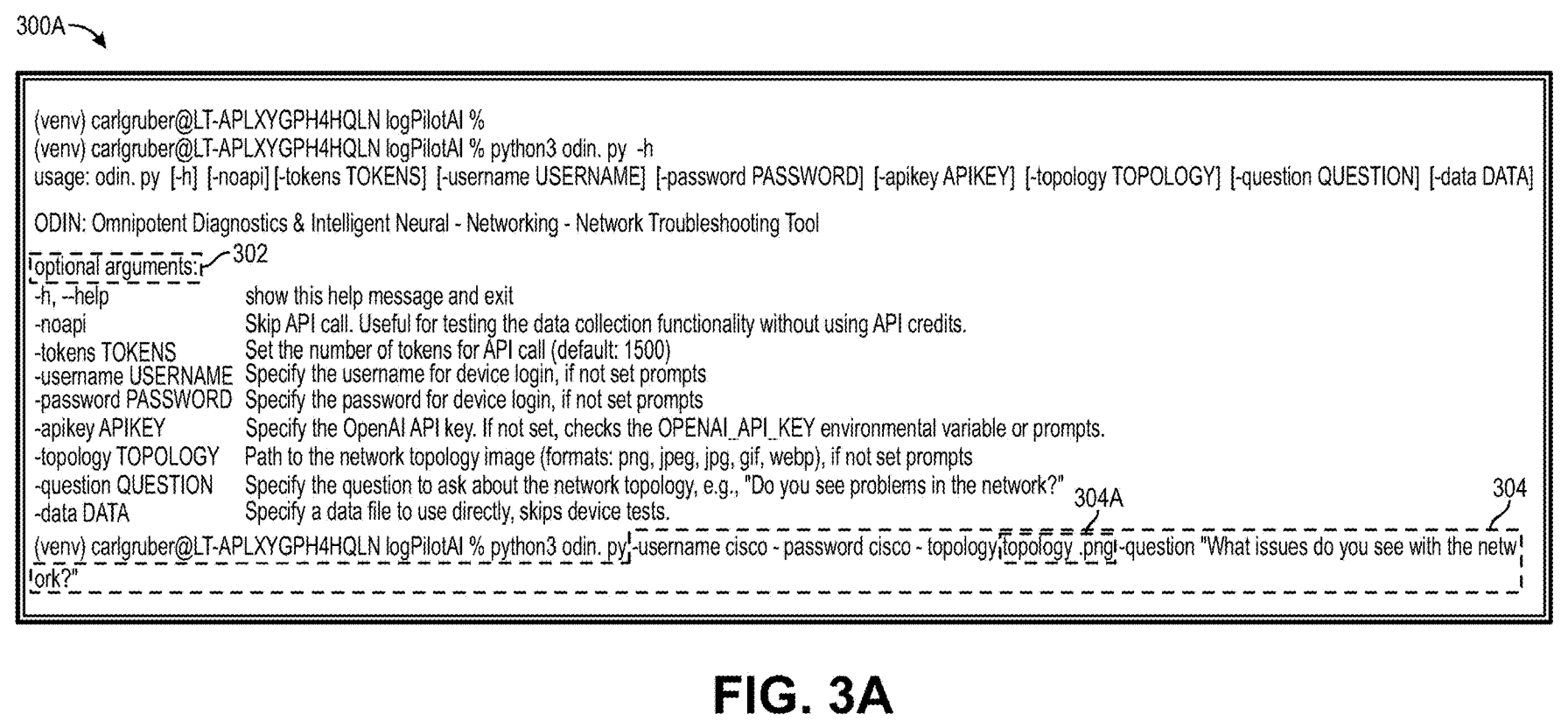

300A

```
(venv) carlgruber@LT-APLXYGPH4HQLN logPilotAI %
(venv) carlgruber@LT-APLXYGPH4HQLN logPilotAI % python3 odin. py -h
usage: odin. py [-h] [-noapi] [-tokens TOKENS] [-username USERNAME] [-password PASSWORD] [-apikey APIKEY] [-topology TOPOLOGY] [-question QUESTION] [-data DATA]

ODIN: Omnipotent Diagnostics & Intelligent Neural - Networking - Network Troubleshooting Tool optional arguments:      302
 -h, --help               show this help message and exit
 -noapi                   Skip API call. Useful for testing the data collection functionality without using API credits.
 -tokens TOKENS           Set the number of tokens for API call (default: 1500)
 -username USERNAME       Specify the username for device login, if not set prompts
 -password PASSWORD       Specify the password for device login, if not set prompts
 -apikey APIKEY           Specify the OpenAI API key. If not set, checks the OPENAI_API_KEY environmental variable or prompts.
 -topology TOPOLOGY       Path to the network topology image (formats: png, jpeg, jpg, gif, webp), if not set prompts
 -question QUESTION       Specify the question to ask about the network topology, e.g., "Do you see problems in the network?"    304A
 -data DATA               Specify a data file to use directly, skips device tests.

(venv) carlgruber@LT-APLXYGPH4HQLN logPilotAI % python3 odin. py -username cisco - password cisco - topology topology_png -question "What issues do you see with the netw
ork?"
```

Figure 3B:
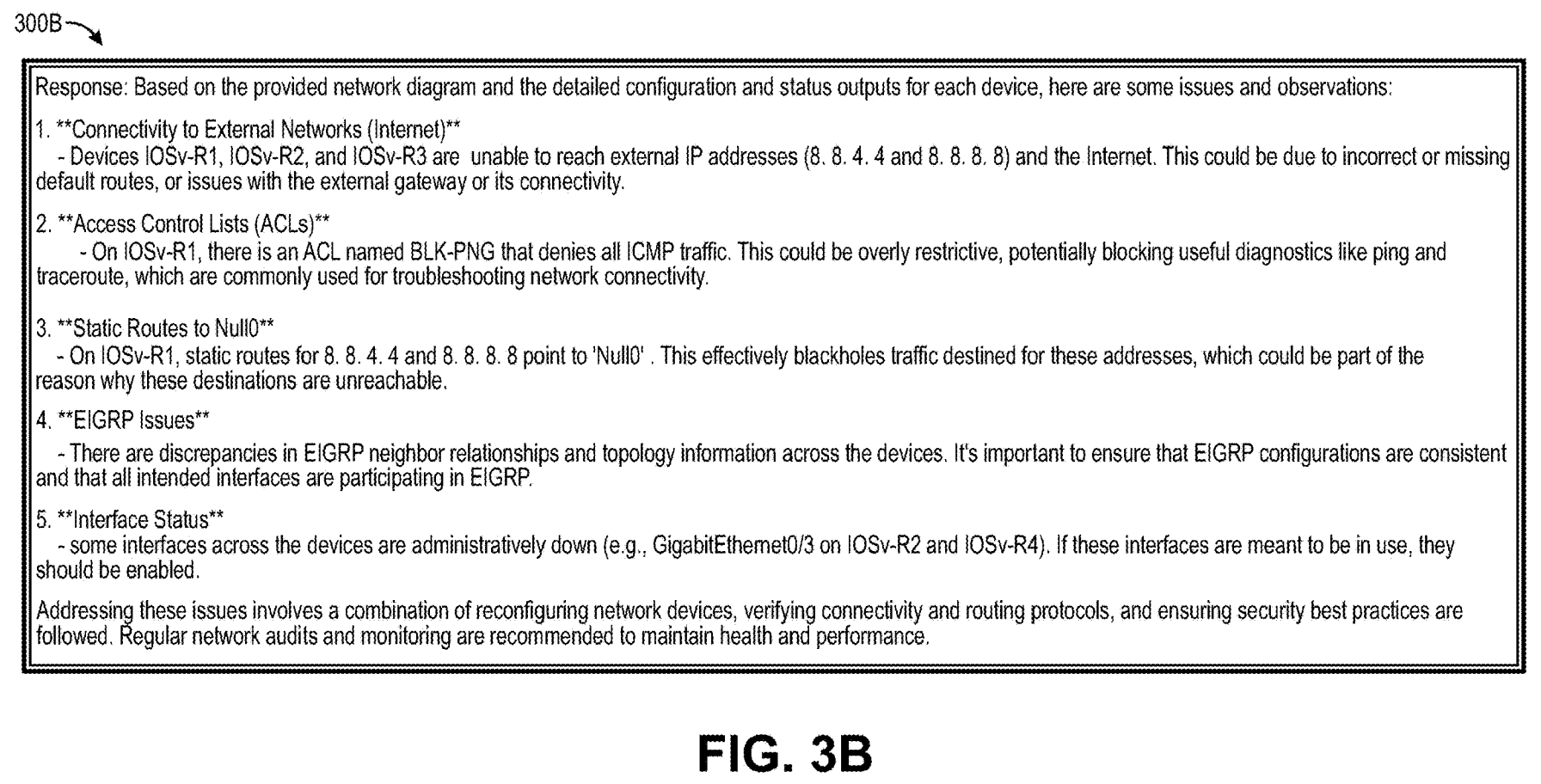

Response: Based on the provided network diagram and the detailed configuration and status outputs for each device, here are some issues and observations:

1. Connectivity to External Networks (Internet)
   - Devices IOSv-R1, IOSv-R2, and IOSv-R3 are unable to reach external IP addresses (8. 8. 4. 4 and 8. 8. 8. 8) and the Internet. This could be due to incorrect or missing default routes, or issues with the external gateway or its connectivity.

2. Access Control Lists (ACLs)
   - On IOSv-R1, there is an ACL named BLK-PNG that denies all ICMP traffic. This could be overly restrictive, potentially blocking useful diagnostics like ping and traceroute, which are commonly used for troubleshooting network connectivity.

3. Static Routes to Null0
   - On IOSv-R1, static routes for 8. 8. 4. 4 and 8. 8. 8. 8 point to 'Null0'. This effectively blackholes traffic destined for these destinations are unreachable.

4. EIGRP Issues
   - There are discrepancies in EIGRP neighbor relationships and topology information across the devices. It's important to ensure that EIGRP configurations are consistent and that all intended interfaces are participating in EIGRP.

5. Interface Status
   - some interfaces across the devices are administratively down (e.g., GigabitEthernet0/3 on IOSv-R2 and IOSv-R4). If these interfaces are meant to be in use, they should be enabled.

Addressing these issues involves a combination of reconfiguring network devices, verifying connectivity and routing protocols, and ensuring security best practices are followed. Regular network audits and monitoring are recommended to maintain health and performance.

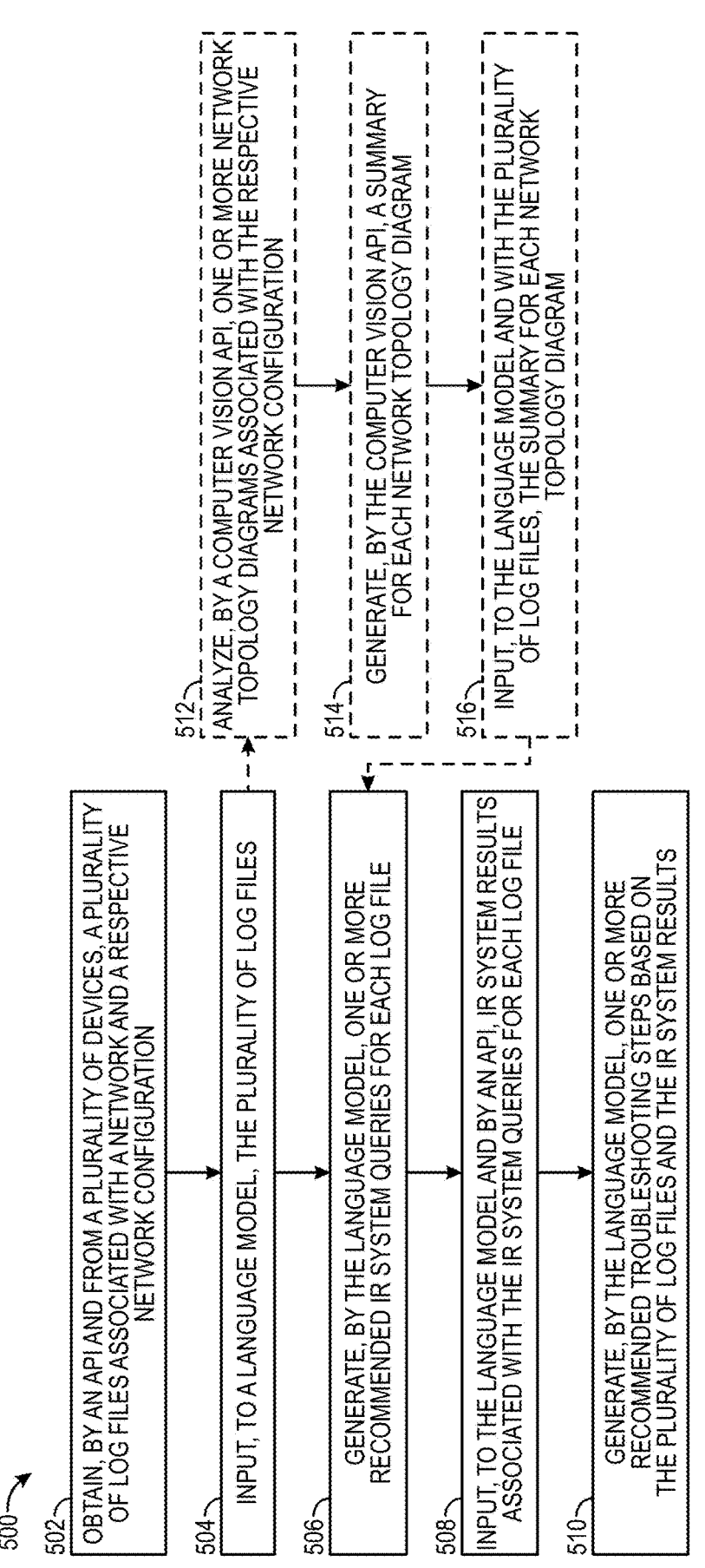

502 — OBTAIN, BY AN API AND FROM A PLURALITY OF DEVICES, A PLURALITY OF LOG FILES ASSOCIATED WITH A NETWORK AND A RESPECTIVE NETWORK CONFIGURATION

504 — INPUT, TO A LANGUAGE MODEL, THE PLURALITY OF LOG FILES

512 — ANALYZE, BY A COMPUTER VISION API, ONE OR MORE NETWORK TOPOLOGY DIAGRAMS ASSOCIATED WITH THE RESPECTIVE NETWORK CONFIGURATION

514 — GENERATE, BY THE COMPUTER VISION API, A SUMMARY FOR EACH NETWORK TOPOLOGY DIAGRAM

516 — INPUT, TO THE LANGUAGE MODEL AND WITH THE PLURALITY OF LOG FILES, THE SUMMARY FOR EACH NETWORK TOPOLOGY DIAGRAM

506 — GENERATE, BY THE LANGUAGE MODEL, ONE OR MORE RECOMMENDED IR SYSTEM QUERIES FOR EACH LOG FILE

508 — INPUT, TO THE LANGUAGE MODEL AND BY AN API, IR SYSTEM RESULTS ASSOCIATED WITH THE IR SYSTEM QUERIES FOR EACH LOG FILE

510 — GENERATE, BY THE LANGUAGE MODEL, ONE OR MORE RECOMMENDED TROUBLESHOOTING STEPS BASED ON THE PLURALITY OF LOG FILES AND THE IR SYSTEM RESULTS

UNIVERSAL NETWORK LANGUAGE MODEL WITH API INTERFACE FOR CROSS-PLATFORM SUPPORT AND LOG SUMMARIZATION

FIELD OF THE DISCLOSURE

The present aspects relate to computing systems and methods for network troubleshooting and support, and more particularly, to systems and methods that utilize language models for log summarization and troubleshooting recommendation generation, such as analyzing network topology diagrams and generating summaries for enhanced troubleshooting.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In contemporary computing environments, managing and troubleshooting network systems can be complex and time-consuming, particularly given the increasing scale and complexity of networks. Given that modern computing environments often utilize a diverse array of network systems and configurations, this diversity necessitates that individuals tasked with troubleshooting possess a broad spectrum of knowledge to effectively address issues. Traditional methods often rely on manual log analysis and network topology examination to identify and diagnose issues. This process can be labor-intensive and prone to error, especially in dynamic environments where network configurations and device states frequently change. Moreover, the reliance on human expertise for interpreting logs and understanding network topologies limits the speed, efficiency, and reliability of troubleshooting activities.

Technological advancements have led to the development of various tools and applications aimed at automating aspects of network management and troubleshooting. However, these solutions often lack the ability to fully understand and interpret the rich context generated in the modern network computing environment. Additionally, the integration between different tools, such as those for log analysis, information retrieval, and network visualization, remains a challenge. This disjointed approach can hinder the identification of optimal troubleshooting steps and delay resolution times for network issues.

Given these challenges, there are significant opportunities for improved platforms and technologies that address these conventional problems.

BRIEF SUMMARY

Techniques, systems, apparatuses, components, devices, and methods are disclosed for cross-platform network support and network log summarization.

In one aspect, a computing system for cross-platform support and log summarization includes: (1) a language model configured to generate information retrieval (IR) system queries and recommended troubleshooting steps for a plurality of networks and respective network configurations; (2) one or more application programming interfaces (API) communicatively interfacing the language model and an IR system and configured to obtain responsive files from the IR system using the IR system queries from the language model; (3) one or more processors; (4) one or more memories that includes computer executable instructions that, when executed by the one or more processors, cause the computing system to: (a) obtain, by an API and from a plurality of devices, a plurality of log files associated with a network and a respective network configuration; (b) input, to the language model, the plurality of log files; (c) generate, by the language model, one or more recommended IR system queries for each log file; (d) input, to the language model and by an API, IR system results associated with the IR system queries for each log file; and (e) generate, by the language model, one or more recommended troubleshooting steps based on the plurality of log files and the IR system results.

In another aspect, a computer-implemented method for cross-platform support and log summarization includes: (1) obtaining, by an API and from a plurality of devices, a plurality of log files associated with a network and a respective network configuration; (2) inputting, to a language model, the plurality of log files; (3) generating, by the language model, one or more recommended IR system queries for each log file; (4) inputting, to the language model and by an API, IR system results associated with the IR system queries for each log file; and (5) generating, by the language model, one or more recommended troubleshooting steps based on the plurality of log files and the IR system results.

In yet another aspect, a non-transitory computer readable medium contains program instructions that when executed by one or more processors, cause a computer to: (1) obtain, by an API and from a plurality of devices, a plurality of log files associated with a network and a respective network configuration; (2) input, to a language model, the plurality of log files; (3) generate, by the language model, one or more recommended IR system queries for each log file; (4) input, to the language model and by an API, IR system results associated with the IR system queries for each log file; and (5) generate, by the language model, one or more recommended troubleshooting steps based on the plurality of log files and the IR system results.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3A depicts an exemplary user interface for cross-platform support and log summarization, according to an aspect.

FIG. 3B depicts an exemplary user interface for cross-platform support and log summarization, according to an aspect.

FIG. 5 depicts an exemplary computer-implemented method for cross-platform support and log summarization, in accordance with the techniques disclosed herein.

Figure 1:
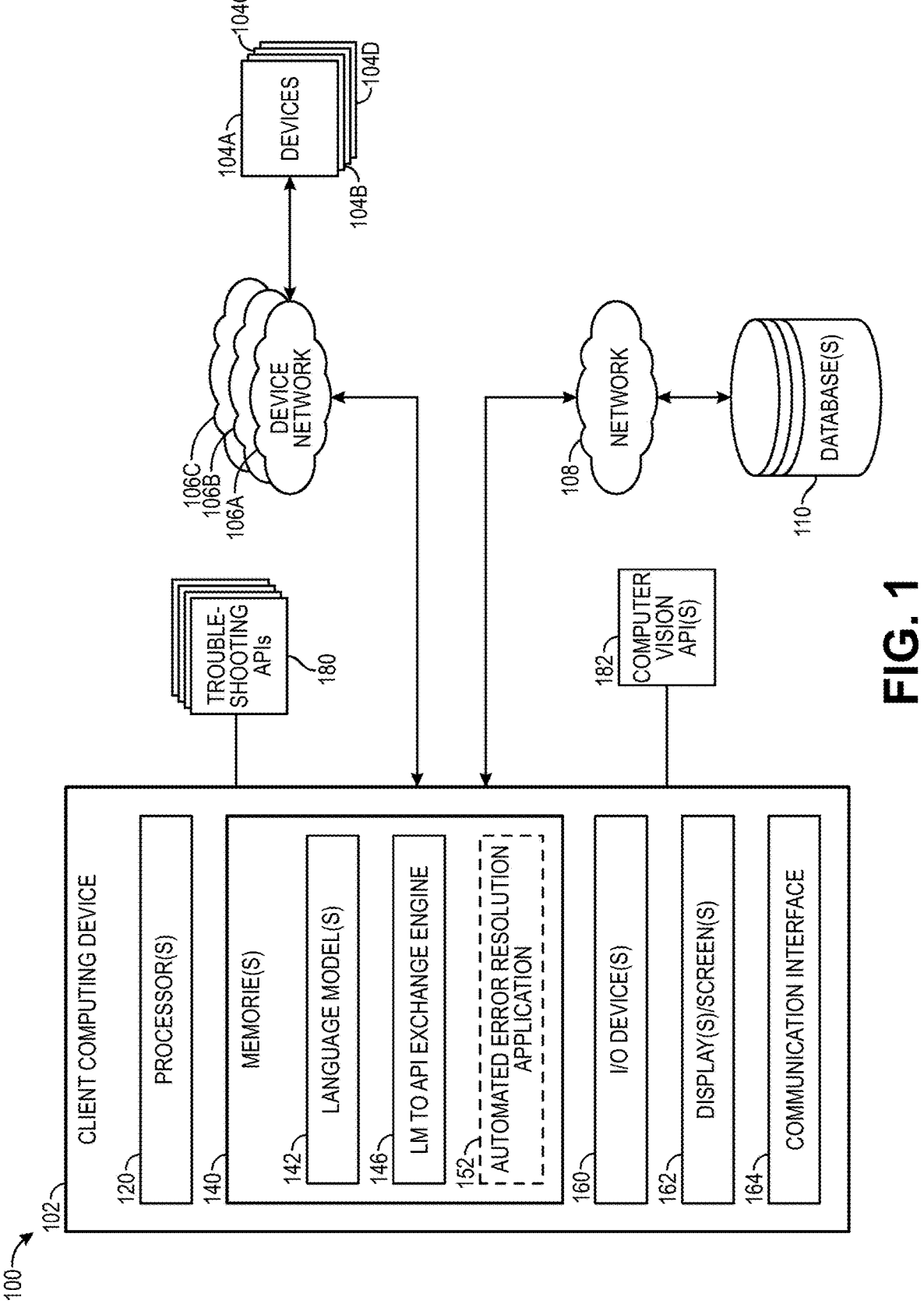
FIG. 1 depicts an exemplary computing environment in which the techniques for cross-platform support and log summarization disclosed herein may be implemented, according to an aspect.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

Generally speaking, an example computing system may obtain logs, or log files, associated with one or more networks and respective network configurations. Moreover, the logs may be network logs and may include timestamps, actions (e.g., error messages, logins, etc.), involved entities, and other information essential for diagnosing issues for an associated network/network configuration. Such logs may be obtained from a plurality of devices, each device being connected to a network with a respective network configuration. An example computing system may obtain such network logs via an application programming interface (API) that is communicatively interfaced with the plurality of devices. An example computing system may additionally include one or more language models and may be configured to input the network logs to the one or more example language models. An example language model may be configured to generate a plain language summary of an input network log. The same or a different example language model may be configured to generate recommended information retrieval (IR) system queries (e.g., search engine queries, vector searches, etc.), in response to an input network log. These recommended IR system queries may be used by an API to obtain corresponding IR system results for each network log from an associated IR system. An example computing system may be configured to input such IR system results to an example language model. Further, an example language model may be configured to generate one or more recommended trouble shooting steps for a network log based on corresponding IR system results input to the model.

In the realm of computing environments, the continuous evolution of technology demands innovative solutions to enhance efficiency, reliability, and user experience. The disclosed computing environment, as detailed herein, represents a significant leap forward in addressing these needs through a system designed to optimize various aspects of computing operations. This system, encompassing a client computing device, multiple devices, device networks, and a network, introduces a multifaceted approach to improving processing capabilities, network usage, and memory utilization. The following paragraphs provide an overview of the disclosed computing environment, focusing on the specific improvements it offers in these areas.

Generally, the present techniques enhance cross-platform support and log summarization through a computing system that leverages a language model, application programming interfaces (APIs), and a combination of processors and memory resources. This system is adept at handling a multitude of networks and their respective configurations, thereby offering a versatile solution to managing and troubleshooting network-related issues. The core of these techniques lies in the ability to efficiently process and analyze log files from various devices across different networks, utilizing the language model to generate insightful information retrieval (IR) system queries and recommended troubleshooting steps. This process not only streamlines the identification of potential network problems but also significantly improves the efficiency of resolving these issues.

One of the improvements introduced by this computing environment is in processing capabilities. The client computing device's processors, which may include CPUs and GPUs, are configured to execute software instructions stored in memory, enabling the device to perform a wide range of computing tasks. This setup allows for the efficient processing of data, from simple computations to complex algorithms required for troubleshooting and network analysis. The inclusion of a language model and a language model to API (LM/API) exchange engine further enhances the device's processing capabilities, enabling it to generate summaries, recommended information retrieval system queries, and troubleshooting steps based on network logs. The system's language model, in conjunction with the processors, is capable of digesting a vast array of log files, transforming these logs into actionable IR system queries. This capability is further augmented by the system's ability to incorporate results from these queries, along with additional network data, into the generation of recommended troubleshooting steps. Such a process not only reduces the computational load but also optimizes the processing workflow, ensuring that network issues can be identified and addressed more swiftly and accurately. Further, this advanced processing capability also improves the overall performance of the computing environment.

Another significant improvement is in network usage and resource utilization. Through the strategic employment of APIs, the system facilitates seamless communication between the language model and an IR system, as well as between the system and a multitude of devices across various networks. This streamlined interaction minimizes unnecessary network traffic, thereby enhancing the efficiency of data retrieval and exchange. The inclusion of a computer vision API further augments this improvement, enabling the system to analyze network topology diagrams and generate summaries that can be integrated into the troubleshooting process. Moreover, a wide variety of network resources (e.g., log files, network topology diagrams, additional network data, etc.) may be utilized (and/or analyzed) in parallel, thereby eliminating the need for disjunct analysis tools that operate independently to evaluate individual network resources. This capability not only enriches the language model's contextual understanding of the network configuration but also optimizes the utilization of network resources. Additionally, this optimized network usage maintains high levels of performance and reliability in the computing environment.

In summary, the disclosed computing environment introduces significant improvements in processing capabilities and network usage. These improvements are achieved through the integration of advanced components, including processors, memory, language models, communication interfaces, and specialized APIs. The computing environment's ability to efficiently process data, optimize network resources, and utilize memory resources enhances its performance, reliability, and user experience. At a high level, the present techniques introduce a multifaceted approach to improving the processing, network usage, and memory utilization of computing systems tasked with cross-platform support and log summarization. By leveraging a language model, strategic API utilization, and optimized memory management, these techniques offer a robust solution to managing and troubleshooting network issues across a diverse range of configurations. This approach not only enhances the efficiency and accuracy of the troubleshooting process but also significantly contributes to the overall performance and reliability of network management systems.

Exemplary Computing Environment

FIG. 1 depicts an exemplary computing environment 100 in which the techniques disclosed herein may be implemented, according to an aspect.

The environment 100 includes a client computing device 102, one or more devices 104, one or more device networks 106, a network 108, and a database 110. The client computing device 102 includes one or more processors 120, one or more memories 140, one or more input/output (I/O) devices 160, one or more displays/screens 162, a communication interface 164, one or more troubleshooting application programming interfaces (APIs) 180, and one or more computer vision APIs 182. The memories 140 may include one or more language models 142, a language model to API (LM/API) exchange engine 146, an automated error resolution application 152, and in some embodiments, one or more language model (LM) training applications. In some embodiments, the database 110 may store network topology diagrams, network configuration resources/documentation, training data for the language model, and other network related information/data.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some aspects the client computing device 102 may be a personal portable device of a user. For example, the client computing device 102 may be the property of a customer, a company, an organization, etc.

The client computing device 102 may include one or more processors 120 and one or more memories 140. The processors 120 may include any suitable number of processors and/or processor types, such as CPUs and one or more graphics processing units (GPUs). Generally, the processors 120 are configured to execute software instructions stored in a memory (e.g., the memories 140). The memory 140 may include one or more persistent memories (e.g., a hard drive/solid state memory) and may store one or more sets of computer executable instructions/modules, including a language model 142, and a LM/API exchange engine 146, as described in more detail below.

The I/O devices 160 may include one or more suitable types of user input devices, such as keyboards, mice, touch pads, touch screen displays, microphones, and/or any suitable types of remote and/or local user input devices. Further, the I/O devices 160 may include one or suitable types of output devices, such as touch screen displays, speakers, and the like. The I/O devices 160 may include one or more local interfaces, and/or may include one or more remote interfaces that are communicatively connected to the client computing device 102 via the network 108 (e.g., that are provided by an application, web browser, or other software executing on a PED of a user). For ease of reading (and not limitation) purposes, I/O device(s) 160 may be referred to herein using the singular tense.

The displays/screens 162 may use any suitable display technology (e.g., LED, OLED, LCD, etc.), and in some embodiments may be integrated with I/O device 160 as a touchscreen display. In some embodiments, the display 162 may not be integral to the client computing device 102 and may receive instructions from the client computing device 102 via wired and/or wireless transmissions over communication interface 164, for example. In an embodiment, I/O device 160 and display 162 may combine to form an integral user interface to enable a user of the client computing device 102 to interact with graphical user interfaces (GUIs) provided by client computing device 102.

The communication interface 164 includes at least one wireless communication interface which includes hardware, firmware, and/or software that is generally configured to communicate with other devices (including at least other mobile devices) and/or over the network 108, or with the one or more devices 104 and/or over the one or more device networks 106, using one or more wireless communication protocols. For example, the communication interfaces 164 may be configured to transmit and receive data using a Bluetooth protocol, a Wi-Fi® (IEEE 802.11 standard) protocol, a near-field communication (NFC) protocol, a cellular (e.g., GSM, CDMA, LTE, WiMAX, etc.) protocol, a peer-to-peer wireless protocol, a short-range wireless protocol, and/or other suitable wireless communication protocols. The communication interfaces 164 may include one or more transceivers to support various different wireless communication protocols; however, as previously mentioned, for ease of reading (and not limitation purposes) herein, the one or more communication interfaces 164 may be referred to herein using the singular tense. Additionally, although not shown in FIG. 1, it is understood that, in some implementations, communication interfaces 164 may include one or more wired communication interfaces which may be utilized by the client computing device 102 to communicatively connect to the network 108, the one or more devices 104, the one or more device networks 106, to the database 110, and/or to other devices via one or more wired communications or data protocols. In some embodiments, the communication interface 164 may be a network interface controller (NIC) and may include any suitable NICs, such as wired/wireless controllers (e.g., Ethernet controllers), and facilitate bidirectional/multiplexed networking over the network 108 between the client computing device 102 and other components of the environment 100 (e.g., the database 110, the one or more devices 104, another client computing device, a remote computing device, etc.).

The memories 140 may include a language model 142 for implementing the various techniques described herein. The language model 142 may be configured, trained, and/or instructed to generate, for each log input to the language model 142: a summary (e.g., a plain language summary), one or more recommended information retrieval (IR) system queries (e.g., a search engine query, a vector database query, etc.), and one or more recommended troubleshooting steps based on the respective IR system retrieval results. In some embodiments, the language model 142 may be trained on a plurality of training log files associated with the one or more networks and the respective network configurations. The training/development of the language model 142, or another language model not depicted in FIG. 1, to process user input data is described below with respect to FIG. 6 and FIG. 7. However, generally, the language model 142, or another language model, may process input data, such as a question about the network (e.g., the device network 106*a*), network log files, IR system results, network topology diagrams, etc., and generate natural language responses based on such input data.

The memories 140 may include a language model to application programming interface (LM to API) exchange engine 146 for implementing the various techniques described herein. In various embodiments, the LM to API exchange engine 146 may include instructions for obtaining, by an API (e.g., troubleshooting API 180) and from a plurality of devices, a plurality of logs associated with one or more networks (e.g., the one or more device networks 106) and respective network configurations. The LM to API exchange engine 146 may additionally include instructions for inputting each log of the plurality of logs to a language model (e.g., the language model 142) and for obtaining a summary of each log from the language model. In some embodiments, the LM to API exchange engine 146 may include instructions for preprocessing the plurality of logs obtained by an API such as troubleshooting API 180 (e.g., for input to a language model such as language model 142). The LM to API exchange engine 146 may include instructions that cause a language model to generate one or more recommended information retrieval (IR) system queries for each log (e.g., for use by an API such as troubleshooting API 180). In various embodiments, the LM to API exchange engine 146 may include instructions for obtaining, by an API (e.g., troubleshooting API 180), IR system results for the one or more recommended IR system queries for each log. Moreover, an example API (e.g., troubleshooting API 180) may obtain the IR system results from a search engine, a database (e.g., utilizing query-driven retrieval), a vector database, etc. The LM to API exchange engine 146 may additionally include instructions for inputting the IR system results for each log to a language model (e.g., language model 142). Additionally, the LM to API exchange engine 146 may include instructions for generating, by a language model (e.g., language model 142) and based on the respective plurality of IR system retrieval results, one or more recommended troubleshooting steps for each log.

In some embodiments, the LM to API exchange engine 146 may include instructions for analyzing one or more network topology diagrams (e.g., network topology diagrams stored in the database 110) for the respective network configurations associated with each log obtained from the one or more devices (e.g., the one or more devices 104) using and/or by a computer vision API (e.g., computer vision API 182). In such embodiments, the LM to API exchange engine 146 may include additional instructions that cause the computer vision API to generate a summary for each network topology diagram. Further to this end, the LM to API exchange engine 146 may include instructions for inputting, to a language model (e.g., language model 142) and with each respective log, the summary for each network topology diagram. In various embodiments, the LM to API exchange engine 146 may include instructions for improving the contextual awareness of a language model based on the IR system results and network topology diagrams for each log (e.g., using the IR system results and network topology diagrams, the computing system 100 is able to finetune a language model such as the language model 142). Moreover, the IR system results (e.g., some which may include image data) and the network topology diagrams, may be converted to graph representations (e.g., by the computer vision API 182) and/or tokenized (e.g., by the LM to API exchange engine 146) for input to a language model. Accordingly, meaningful network information included in the IR system results and the network topology diagrams may be used to further expand the contextual understanding of the language model, thereby improving the language model's ability to generate the recommended trouble shooting steps and/or one or more responses to questions input to the language model. In some embodiments the LM to API exchange engine 146 may include instructions for inputting, to the language model and with each respective log, additional network data (e.g., active device states, network interface configurations, etc.). Conventional computing systems for processing network log files do not leverage such detailed network information.

In some embodiments, the memories 140 may include an automated error resolution (AER) application 152, which may include instructions for automatically detecting an exception/failure state of one or more remote devices (e.g., the one or more devices 104) by monitoring network log files and/or device states directly. The AER application 152 may additionally include instructions for constructing an electronic object corresponding to the exception/failure state, and using the language model 142 to determine a fix for the issue. In some embodiments, using the language model 142 to determine a fix includes generating configuration data/code that will be run on the one or more remote devices to effect a repair/change to cause the failing device to transition into a non-fail state. The AER application 152 may additionally include instructions for causing the configuration data/code to be executed on the remote device and determining that the device has transitioned into a different state by accessing the device. Additionally, the AER application 152 may include instructions for updating the electronic object to reflect the different state.

The trouble shooting APIs 180 may facilitate interaction between components and/or devices of the computing system 100. Generally, the troubleshooting APIs 180 may be configured to receive data, and/or information, from a component of the computing system 100 and to provide such data to a different component of the computing system 100. For example, the troubleshooting APIs 180 may be configured to obtain a plurality of network logs (e.g., logs associated with a network, such as the one or more device networks 106) from a plurality of devices (e.g., the one or more devices 104). As another example, the troubleshooting API 180 may be configured to receive one or more recommended IR system queries from a language model (e.g., language model 142) and may be configured to input the one or more queries to an IR system, and thereafter obtain IR system results for each of the one or more queries.

The one or more computer vision APIs 182 may include a visual processing model/application, for instance, a convolutional neural network (CNN), an image-to-graph transformer, a graph neural network (GNN), a multilayer perceptron, etc. Generally, the one or more computer vision APIs 182 may generate graph representations (e.g., a text file) of visual data, and may provide the graph representations to the one or more language models 142, thereby enabling the one or more language models 142 to interpret visual data (e.g., network topology diagrams stored on the database 110).

The one or more devices 104 (e.g., devices 104a-104d) may be, respectively, any suitable type of computing device or system (e.g., a collection of computing resources). For example, the one or more devices 104 may be, respectively, a mobile computing device (e.g., a server computer, a personal computer, a smart phone, a tablet, a laptop, a wearable device, etc.). In some aspects a device 104 (e.g., any of devices 104a-104d) may be a personal portable device of a user. For example, the device 104 may be the property of a customer, a company, an organization, etc. In various embodiments, the one or more devices 104 may be associated with (or configured for) the one or more device networks 106, a device 104 (e.g., device 104a, device 104b, etc.) may be configured for and/or associated with one, or more, of the device networks 106. Additionally, the one or more devices 104, although only depicted as four devices (104a, 104b, 104c, and 104d), may include any number of devices (e.g., 104a-104n; where n is a positive integer).

The one or more device networks 106 may include multiple communication networks of one or more types (e.g., one or more wired and/or wireless local area networks (LANs), and/or one or more wired and/or wireless wide area networks (WANs) such as the Internet). The networks 106 may enable bidirectional communication between the client computing device 102 and the one or more devices 104, and/or between multiple client computing devices 102, for example. Although only depicted as three device networks (106a, 106b, and 106c), the one or more device networks 106 may include any number of device networks (e.g., 106a-106n). For example, the one or more devices 104 may each be configured for a singular device network 106 (e.g., device network 106a). As another example, the one or more devices 104a-104d may each be configured for one or more device networks 106a-106d.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the database 110, and/or between multiple client computing devices 102, for example.

The database 110 may store data and/or information related to various networks (e.g., the one or more device networks 106). For example, the database 110 may store information associated with network configurations, network troubleshooting steps, network interfaces, etc. In many embodiments, the database 110 may store a plurality of network topology diagrams and/or a plurality of corresponding graph representations. The database 110 may be communicatively connected (e.g., via the network 108) to the client computing device 102, the one or more devices 104, and/or another computing device of the system 100. In some embodiments, the database 110 may use an information retrieval (IR) system, generally employing query-driven retrieval to obtain files that are responsive to a system query. While not explicitly depicted in FIG. 1, in some embodiments, the computing environment 100 may include an IR system, separate from the database 110. For example, the computing environment 100 may include, and/or access (e.g., via troubleshooting APIs 180), various IR systems including search engines, a vector database, a digital library, the database 110 etc.

In operation, the computing system 100 may be accessed by a user (e.g., a network engineer) and the user may enter input data via a user interface (e.g., using the I/O devices 160 and the displays/screens 162). The input data may include a question or query for a language model (e.g., the language model 142) regarding a network or network configuration, login credentials, and network data/information. The language model may process such input data, output results or responses for the input data, process the outputs, and display the outputs (e.g., via the displays/screens 162) for review by the user. The operation of the computing system 100 is referenced further below.

Exemplary Signal Diagram

Figure 2:
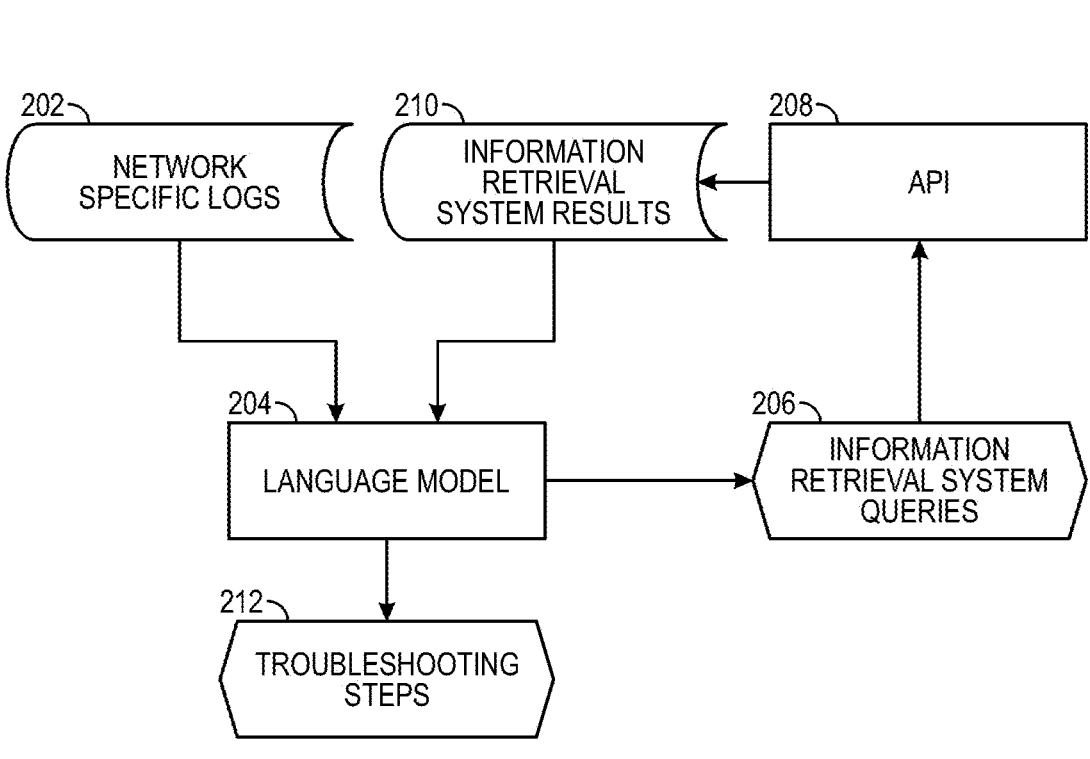
FIG. 2 depicts an exemplary signal diagram, according to an aspect.

FIG. 2 depicts an example signal diagram 200 in which the techniques disclosed herein may be implemented. The example signal diagram 200 includes one or more network specific logs 202, a language model 204, one or more information retrieval (IR) system queries 206, one or more application programming interfaces (API) 208, one or more IR system results 210, and one or more troubleshooting steps 212. Although not explicitly depicted in FIG. 2, the network specific logs 202 may be obtained by an API (e.g., the APIs 208). Additionally and in various embodiments, the network specific logs may include timestamps, actions (e.g., error messages, logins, etc.), involved entities, and other information essential for diagnosing issues for the associated network. The language model 204 may be, and/or include, any suitable language model (LM) and/or large language model (LLM). In various embodiments, the language model 204 may be configured to output one or more IR system queries (e.g. the IR system queries 206) in response to one or more input network logs (e.g., the network logs 202). Additionally and/or alternatively, the language model 204 may also be configured to output one or more troubleshooting steps (e.g., troubleshooting steps 212) in response to one or more input IR system results (e.g., IR system results 210). In various embodiments, the API 208 may be configured to retrieve, and/or obtain, one or more IR system results (e.g., IR system results 210) based on one or more IR system queries (e.g., IR system queries 206). Additionally, the API 208 may be configured to input the one or more retrieved IR system results to a language model (e.g., the language model 204).

At a high level and as depicted in the example signal diagram of FIG. 2, the network specific logs 202 may be input to the language model 204, and in response, the language model 204 outputs the IR system queries 206. The API 208 may then obtain the IR system results 210 based on the IR system queries 206, and the API 208 may input the IR system results 210 to the language model 204. The language model 204 may then output one or more troubleshooting steps 212 based on the IR system results 210.

Exemplary User Interfaces

FIG. 3A depicts an exemplary user interface 300a for allowing a user to interact with the exemplary language models disclosed herein (e.g., the language model 142 of FIG. 1, and/or the language model 204 of FIG. 2). Although FIG. 3A depicts a command line user interface 300a, it should be understood that various embodiments of the present invention may include other kinds of user interfaces 300a. For example, the user interface 300a may be a graphical user interface, a web-based user interface, a natural language user interface, etc. In many embodiments, the exemplary user interface 300a may include descriptions of various optional arguments 302 (or inputs 302) including, but not limited to, arguments associated with login information, APIs, network questions, system help, etc. The exemplary user interface may include a user input section for entering arguments to be input to an exemplary language model. In the example scenario of FIG. 3A and FIG. 3B, a user may wish to know more about a network of devices. In particular, the example user interface 300a includes the following example user input 304:

username cisco-password cisco-topology topology.png-question "What issues do you see with the network?"

An exemplary language model may evaluate the input question(s), and may evaluate other available input data such as, a network topology diagram. In the above example user input 304, the topology.png 304a parameter corresponds to the network topology diagram 400 of FIG. 4. For example, the input questions (e.g., "What issues do you see with the network?") may be tokenized for input to the language model, and similarly, the input network topology diagram (e.g., topology.png 304a) may be converted to a graph representation (e.g., by the computer vision API 182) and tokenized for input to the language model. The language model may then analyze network log files (e.g., tokenized network log files) obtained from the devices of the network of interest and the tokenized graph representation of the network topology diagrams to generate queries for an information retrieval (IR) system. Based on the documents responsive to the IR system queries, the network log files, and the graph representation of the network topology diagram, the language model can generate one or more responses to the input question including one or more troubleshooting steps for the network of interest. The language model may also evaluate a specific data file (e.g., a file including relevant network logs), etc. Additionally and/or alternatively, the exemplary language model may obtain relevant network logs from the devices of the associated network.

FIG. 3B depicts an exemplary user interface 300b for displaying responses from the exemplary language models disclosed herein (e.g., the language model 142 of FIG. 1, and/or the language model 204 of FIG. 2) based on arguments input to the user input section of the user interface 300a.

Exemplary Network Topology Diagram

Figure 4:
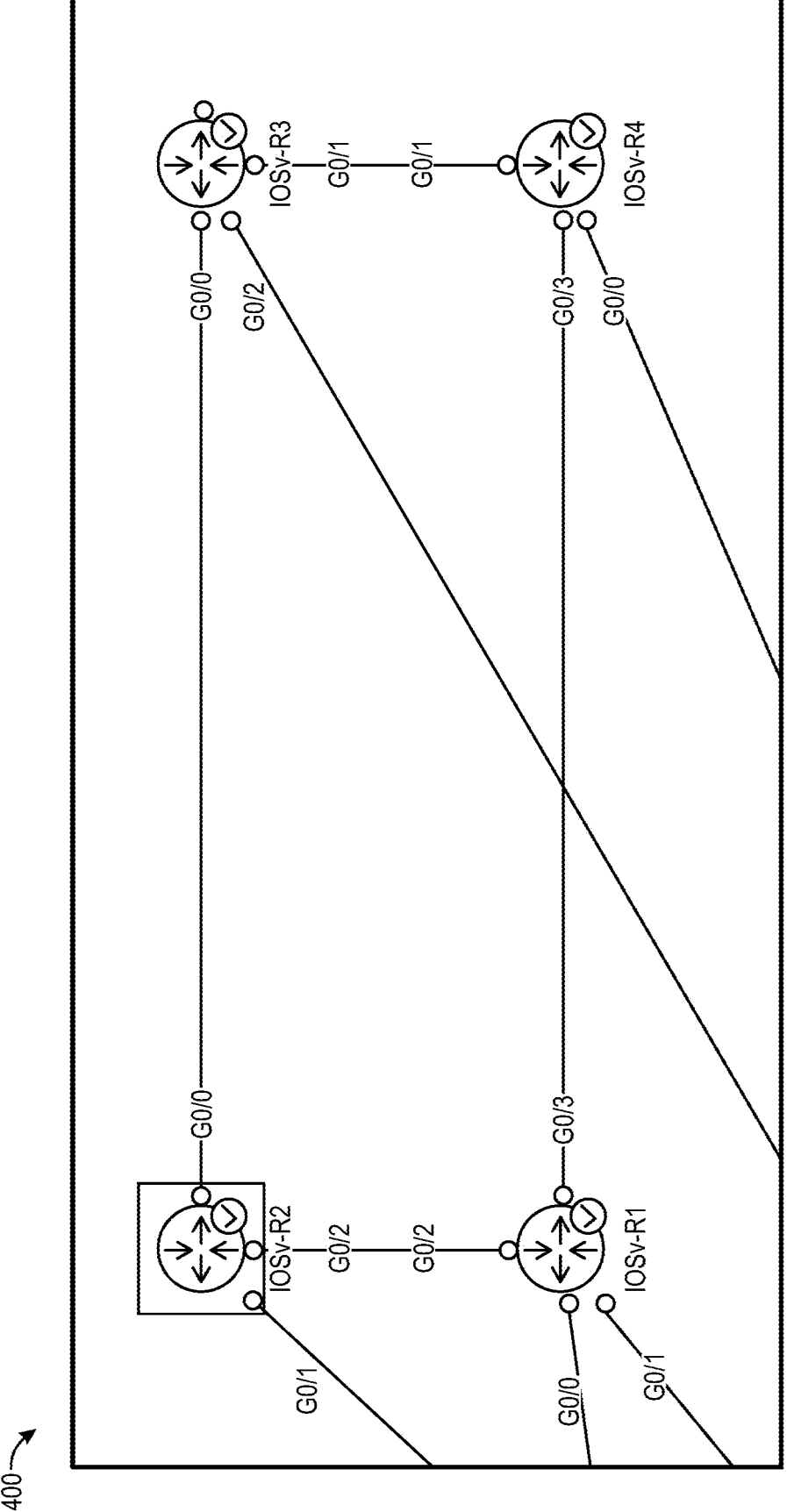
FIG. 4 depicts an exemplary network topology diagram, according to an aspect.

FIG. 4 depicts an exemplary network topology diagram 400 that includes four exemplary devices: IOSv-R1, IOSv-R2, IOSv-R3, and IOSv-R4. Additionally, it should be understood that the exemplary network topology diagram 400 corresponds to the network topology diagram called in the example user input 304 of user interface 300a (e.g., topology.png 304a).

Exemplary Computer Implemented Method

FIG. 5 depicts a computer-implemented method 500 for cross-platform support and log summarization. This method 500 is designed to streamline the process of troubleshooting across various network configurations by leveraging a language model to analyze log files, generate information retrieval (IR) system queries, and recommend troubleshooting steps based on the analysis of log files and IR system results.

The method 500 may include obtaining, by an API and from a plurality of devices, a plurality of log files associated with a network and a respective network configuration (block 502). This step involves the use of application programming interfaces (APIs) to collect log files from different devices within a network. These log files contain valuable data regarding the operational status, errors, and other relevant information about the network and its devices.

The method 500 may include inputting, to a language model, the plurality of log files (block 504). Here, the collected log files are fed into a language model. The language model is an algorithm capable of understanding and processing natural language data. It analyzes the log files to extract meaningful information that can be used for troubleshooting and understanding the network's current state.

The method 500 may include generating, by the language model, one or more recommended IR system queries for each log file (block 506). Based on the analysis of the log files, the language model formulates queries that can be used to search an information retrieval (IR) system for relevant troubleshooting information, documentation, or similar issues encountered in other network configurations.

The method 500 may include inputting, to the language model and by an API, IR system results associated with the IR system queries for each log file (block 508). The IR system queries generated in the previous step are executed using an API, and the results obtained from the IR system are then fed back into the language model. This allows the language model to have access to a broader context when generating troubleshooting recommendations.

The method 500 may include generating, by the language model, one or more recommended troubleshooting steps based on the plurality of log files and the IR system results (block 510). With a understanding of the issues presented in the log files and additional insights gained from the IR system results, the language model generates recommended steps for troubleshooting the identified issues within the network.

The method 500 may include analyzing, by a computer vision API, one or more network topology diagrams associated with the respective network configuration (block 512). This step involves the use of computer vision technology to analyze network topology diagrams. These diagrams provide a visual representation of the network's structure, including devices and connections, which further supplements the language model's understanding of complex network issues.

The method 500 may include generating, by the computer vision API, a summary for each network topology diagram (block 514). The analysis conducted by the computer vision API is summarized to provide concise and relevant information about the network's topology. This summary can include details about the network's layout, critical nodes, and potential points of failure.

The method 500 may include inputting, to the language model and with the plurality of log files, the summary for each network topology diagram (block 516). The summary generated from the network topology diagrams is combined with the log files and input into the language model. This integration allows the language model to consider the network's physical and logical structure when generating troubleshooting recommendations, leading to more accurate and context-aware solutions.

The method 500 may additionally include inputting, to the language model and with the plurality of log files, additional network data including active device states and network interface configurations. This step enriches the data available to the language model by including real-time information about the network's devices and their configurations. Active device states can indicate the current operational status of devices, while network interface configurations provide details on how devices are interconnected. This additional data helps the language model to generate more precise and effective troubleshooting steps by considering the current state and setup of the network.

The method 500 may additionally include obtaining the plurality of log files in response to user input, wherein the user input data includes one or more questions about the network. This feature allows users to interact directly with the system by posing specific questions or describing issues they are experiencing with the network. The system then focuses on obtaining and analyzing log files relevant to the user's inquiries, ensuring that the troubleshooting process is targeted and efficient.

The method 500 may additionally include obtaining the IR system results from either a search engine or a database of the computing system utilizing query-driven retrieval. This flexibility in sourcing IR system results enables the system to access a wide range of information, from publicly available resources to proprietary databases, ensuring support for troubleshooting efforts.

Exemplary Language Model Block Flow Diagram

Figure 6:
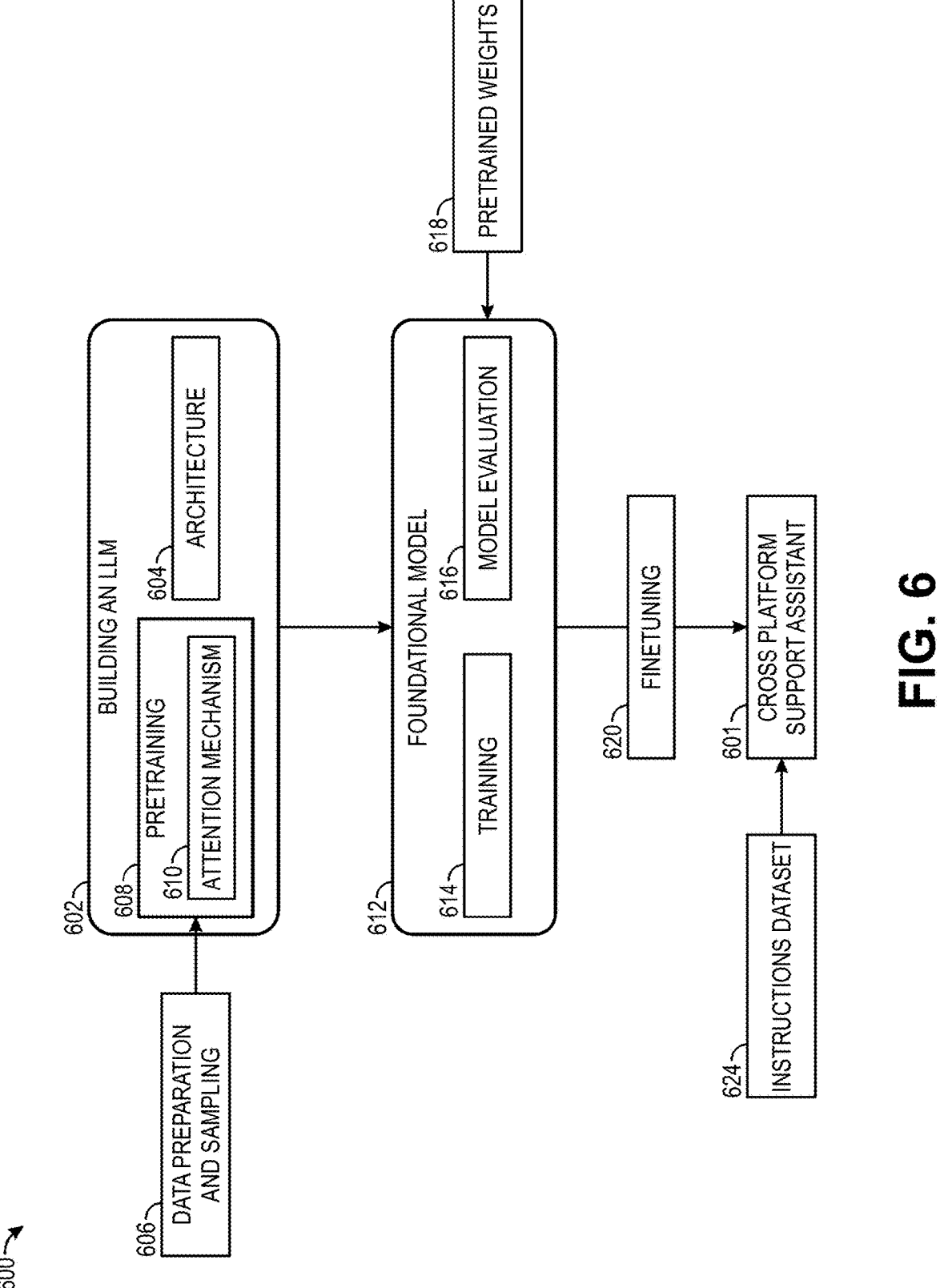
FIG. 6 depicts an exemplary block flow diagram for developing a large language model personal assistant, according to some aspects.

FIG. 6 depicts an exemplary block flow diagram 600 for developing a cross platform support assistant 601, according to some aspects. In many embodiments, the cross platform support assistant 601 may be a language model (LM) such as a large language model (LLM). Building an LLM generally includes implementing a model architecture 604, data preparation and sampling 606, and pretraining 608, as depicted at block 602. The present techniques may include training one or more LMs and/or LLM to predict the next word, or token, in a sequence of words/tokens.

The language model architecture 604 (e.g., the structural design and/or framework of a model) may be selected based upon the intended use case of the language model. For example, the language model architecture 604 may be a transformer architecture, a bidirectional encoder representations from transformers (BERT) architecture, another suitable architecture, or a suitable architecture not yet contemplated in the art.

Data preparation and sampling 606 may include collecting organized and diverse datasets (e.g., massive corpuses of data from the internet or another vast data source) of high quality for training the language model to predict the next token in a sequence of tokens. Exposing a language model to varying linguistic patterns and linguistic nuances may improve the language model's ability to understand and/or analyze input data and may, consequently, improve the language model's ability to generate accurate responses (e.g., accurate text responses).

Pretraining 608 may include training a language model on organized on diverse datasets (e.g., the data from data preparation and sampling 606) such that the language model learns general natural language patterns and nuances. Pretraining 608 may additionally include implementing an attention mechanism 610 to provide the language model with improved contextual understanding. Moreover, pertaining 608 converts a language model to a foundational model with a strong understanding of natural language.

The attention mechanism 610 allows a language model to look backwards and forwards (across the token window) when predicting the next token in a sequence and allows the language model to focus on certain types of data (e.g., data that is relevant to the particular application and/or use case of the language model). For example, the attention mechanism 610 may assign a level of importance (e.g., weights) to elements of input data (e.g., words in a sentence). As another example, a self-attention mechanism 610 allows a language model to focus on portions of an input sequence and consider dependencies across the sequence. Additionally, a language model may include one or more attention mechanisms 610, or attention heads 610, allowing the language model to consider local and global context. Moreover, the attention mechanism 610 may provide a language model with the ability to selectively focus on relevant elements of input data while placing less emphasis on other elements of the input data. In contrast, machine learning models/techniques such as recurrent neural networks (RNNs), convolutional neural networks (CNNs), etc., have limited context windows, and consequently struggle to achieve the broad contextual understanding of an input sequence provided by attention mechanism 610. In some embodiments, another learning mechanism, besides the attention mechanism 610, may be implemented to provide the language model with the ability to consider positions of tokens in a sequence, such as a positional encoding mechanism.

Developing a cross platform support assistant 601 may include training 614 and model evaluation 616 of a foundation model, as depicted at block 612. In some embodiments, pretrained weights 618 may be loaded into a language model. Training 614 may include inputting data to a foundation model to generate response/outputs, calculating a loss based on comparing the models output to ground truth data (e.g., labeled input data), identifying gradients of trainable weights in the model with respect to the calculated loss (e.g., the rate of change of a loss function with respect to the model's weights), and optimizing the model's performance to minimize the loss by updating the weights of the model based on the identified gradients. Model evaluation 616 may include evaluating the performance of a foundational model using a validation dataset (e.g., a dataset not included in the training data used to train the model). Moreover, validation loss may be compared to training loss (e.g., the calculated loss above) in model evaluation 616. For example, validation loss of the model exceeding the training loss may be an indication that the language model is overfitting to the training data. In some embodiments, pretrained weights 618 may be loaded into a large language model and may provide a computationally efficient approach/alternative to pretraining a large language model to generate a foundational model.

Finetuning 620 may include training the foundational model on key value pairs (e.g., inputs and desired outputs) such that the foundational model learns to predict a desired output. Finetuning 620 may include adjusting and/or training the final layers of a foundational model. A foundational model may already excel at understanding language and performing natural language oriented tasks. Moreover, by updating the final layers of the foundational model (e.g., leaving the rest of the model frozen while the final layers are trained on task specific data) the contextual understanding of a trained foundational model may be preserved while improving the foundation models performance in the specific task at hand. Additionally, training only the final layers of a foundational model may be less computationally expensive then training the entire model. Additionally and/or alternatively, finetuning 620 may include training all layers of the model on task specific data. In some embodiments, training or finetuning the entirety of a foundational model on task specific data, as opposed to training the final layers of the model, may provide improved performance.

At a high level, the cross platform support assistant 601 may be generated by finetuning (e.g., finetuning 620) a foundational model. Moreover, the cross platform support assistant 601 may be a foundational model (e.g., GPT-4, LaMDA, LLaMa, etc.) finetuned on network log files and additional network data (e.g., active device states, network interface configurations, graph representations of network topology diagrams, etc.).

An instructions dataset 624, or prompts 624, may include natural language instructions and input data for the cross platform support assistant 601 that cause the cross platform support assistant 601 to process input data (e.g., in a particular manner described in the instructions dataset 624) and generate a desired output. In some embodiments, key values pairs may be provided within the instructions dataset 624, often termed one shot training. In such embodiments, while the foundational model may not technically be finetuned, one shot training may provide further task-specific context and understanding to the foundational model (e.g., similar to finetuning 620). Moreover and in some embodiments, the cross platform support assistant 601 may be a foundational model (e.g., a foundational model that has not been finetuned) and the network log files and additional network data may be integrated into the instructions dataset 624 for input to the foundational model.

Generally, prompt engineering may provide additional task specific context and understanding to the cross platform support assistant 601. For example, in embodiments where the cross platform support assistant 601 is a foundational model that has not been finetuned, prompt engineering may provide a computationally efficient alternative, or supplement, to finetuning a foundational model. Moreover, a foundational model may effectively by finetuned by providing task specific instructions within natural language prompts (e.g., instructions dataset 624) to the foundational model. Various prompt engineering styles may provide improved performance to the cross platform assistant 601. For example, chain of thought prompting includes instructing a large language model to reach intermediate conclusions (e.g., that may be individually validated) and output such intermediate conclusions in combination with the generated response to the prompt. Such an approach may result in improved results/outputs from large language model, as reaching intermediate conclusions may provide additional context for the model when generating the final output. As another example, iterative prompting may include adjusting a prompt based on the accuracy of the generated output in response to the prompt thereby iteratively refining the prompt. Moreover, prompt engineering may provide the cross platform support assistant 601, and/or a foundational model, with additional task-specific context and refined instructions that augment the models ability to generate accurate responses.

Exemplary Language Model Architecture

Figure 7:
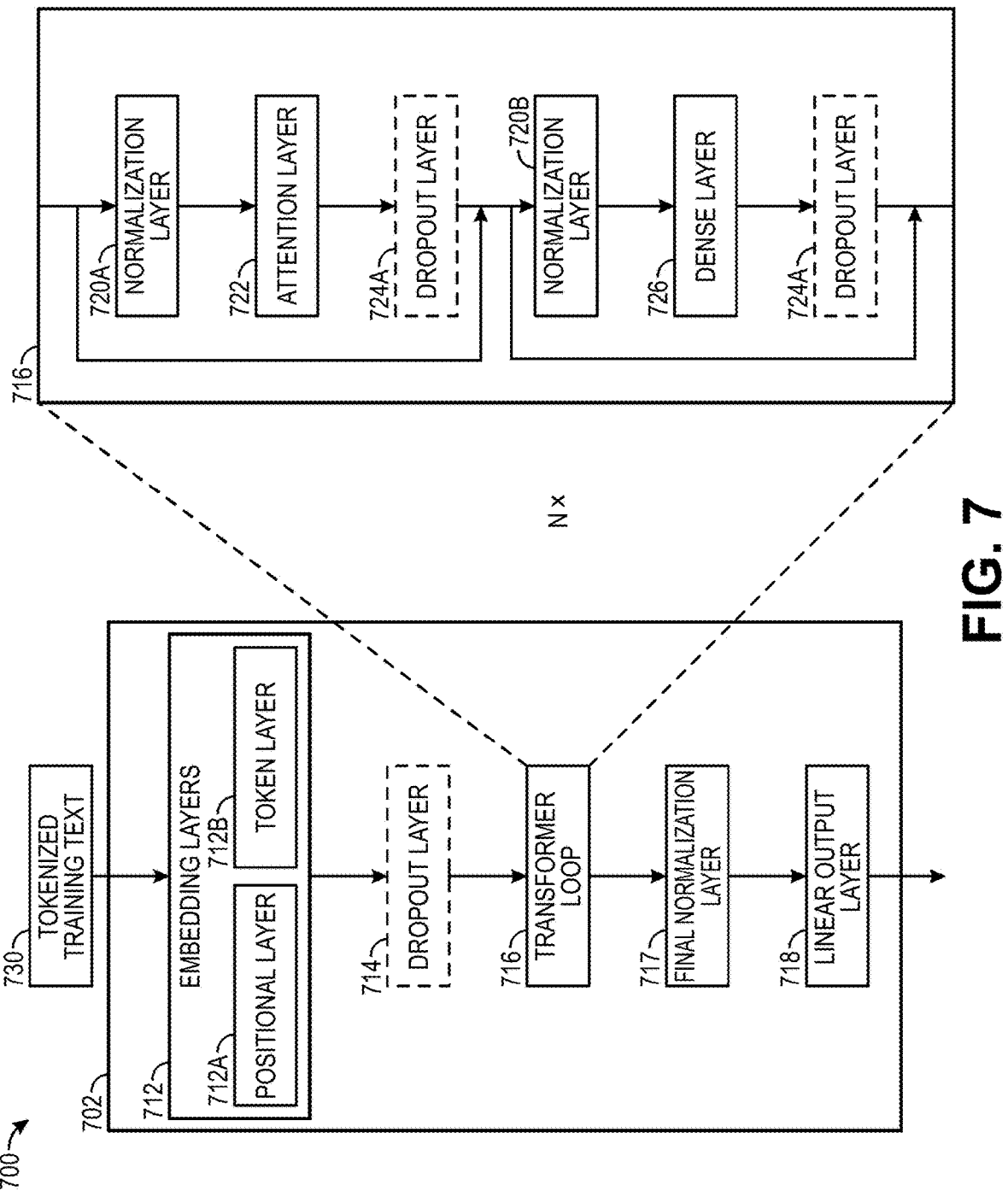
FIG. 7 depicts an exemplary large language model architecture, according to an aspect.

FIG. 7 depicts an exemplary large language model architecture 700 for processing and understanding natural language inputs, according to an aspect. The language model 702 may include embedding layers 712, a dropout layer 714, a transformer loop 716, a final normalization layer 717, and a linear output layer 718. In some embodiments, the embedding layers may include a positional embedding layer 712*a* and a token embedding layer 712*b*. The transformer loop 716 may be repeated N times and may include a normalization layer 720*a*, an attention layer 722, a dropout layer 724*a*, a normalization layer 720*b*, a dense layer 726, and a dropout layer 724*a*. Generally, training text (e.g., the works of Shakespeare) may be tokenized to generated tokenized training text 730 for input to the language model 702. Additionally, the language model 702 operates in a high-dimensional space, or vector space, defined by the internal embeddings and weights of the language model 702 and the language model possesses a particular dimensionality based on the number of features this space. Moreover, the dimensionality of the language model 702 corresponds to the number of tokens that can be represented as a vector in this high-dimensional vector space.

The architecture 700 begins with the embedding layers 712 for converting input text into a format that the model can process. The positional embedding layer 712*a* may assign a unique position to each word in the input sequence, ensuring the model can recognize the order of words. The token embedding layer 712*b* may convert each word into a high-dimensional vector, capturing semantic information about the word.

Following the embedding layers, the dropout layer 714 may prevent overfitting by randomly omitting some of the features during training. This ensures that the model remains generalizable to new and unseen data. The core of the architecture is the transformer loop 716, which the model may repeat N times to deeply process the input data (e.g., tokenized training text 730). Within each iteration of the transformer loop, a normalization layer 720*a* may mitigate vanishing or exploding gradients. Additionally, the normalization layer 720*a* may ensure the input embeddings (e.g., from embedding layers 712*a* and 712*b*) fall within a reasonable range. The normalization layer 720*a* precedes an attention layer 722 (e.g., attention mechanism 610 of FIG. 6), which may provide the language model 702 with a means for focusing on different parts of the input sequence (e.g., tokenized training text 730) for better understanding. In some embodiments, the attention layer 722 is followed by another dropout layer 724*a*, which may further aid in generalizing the model for new and unseen data. A second normalization layer 720*b* and a dense layer 726 succeed the dropout layer 724*a*, providing additional processing and transformation of the data. The dense layer 726, or a fully connected layer 726, may convert the dimensionality of the output of the model. In some embodiments, the final dropout layer 724*b* may provide additional robustness and generalization of the model before the loop repeats or concludes.

After exiting the transformer loop, the model may apply a final normalization layer 717 to stabilize the learned features of the input sample text 730. The linear output layer 718 may then converts these features into a format suitable for the specific task at hand, such as classification or text generation. Moreover, the linear output layer 718 produces the predictions of the language model 702 based on the processed set of instructions provided to the language model 702. In some embodiments, although not depicted explicitly in FIG. 7, the language model 702 may include an instructions layer. The instructions layer may process a set of instructions input to the language model 702 and prioritize an instruction in the set over a conflicting instruction based on the relevance and importance of the conflicting instructions.

In operation, users or automated systems may input text into the language model 702. The text may then undergo processing through the described layers (e.g., embedding layers 712, normalization layers 720*a*-720*b*, dropout layers 724*a*-724*b*, attention layer 722, dense layer 726, etc.) of the language model 702. The language model architecture 700 supports a wide range of natural language processing tasks, enabling it to generate responses, classify text, or even predict subsequent words in a sequence. Users can interact with the language model 702 through various computing environments such as the computing environment 200 of FIG. 2. The flexibility and depth of processing provided by the language model architecture 700 make it suitable for complex language understanding and generation tasks, offering significant utility in applications such as personal assistants, chatbots, content creation tools, and more.

Operation of an Exemplary Computing Environment

A user, such as a network engineer or software developer, may be experiencing issues with a network of devices. Generally, modern network configurations may be nuanced and unique, thereby requiring the user to possess vast and detailed knowledge of the network configuration/protocols of the network in question.

The exemplary computing environment (e.g., the computing system 100 of FIG. 1) of the claimed invention lowers the barrier to entry for a user to troubleshoot a complex network that is experiencing issues. In operation, an exemplary computing system may display a user interface (e.g., user interface 300a of FIG. 3A) that allows the user to input a query regarding a particular network. Additionally, the user may also enter additional network information and/or data (e.g., a network topology diagram, a plurality of network log files, active device states, etc.) to be processed for input to a language model. The computing system may retrieve a plurality of network log files (e.g., via the APIs 180) from a plurality of devices of the network of interest and process the log files for input to a language model. The language model (e.g., the language model 142 of FIG. 1, the language model 204 of FIG. 2, the cross platform assistant 601 of FIG. 6, and/or the language model 702 of FIG. 7) may process such input data (e.g., as described with respect to FIG. 7) and generate one or more queries for an information retrieval (IR) system (e.g., IR system queries 206 of FIG. 2). The computing system may then retrieve documents responsive to the generated IR system queries and process the responsive documents for input to the language model. The language model may then process the input data (e.g., the network log files, the question from the user, etc.) and the responsive documents to generate one or more responses (e.g., troubleshooting steps 212 of FIG. 2 and/or the outputs 1-5 depicted in FIG. 3B). The computing system may then process the one or more responses and display the responses to the user via a user interface (e.g., user interface 300b of FIG. 3B).

For example, a network's throughput may be limited, and a user may wish to know more about the network before troubleshooting the network. In this example, the user may input a query (e.g., "What issues do you see with the network?" as depicted in FIG. 3A), login credentials, and any known network information, via a user interface of the exemplary computing system. Based upon the input data the computing system may generate, using one or more of the exemplary language models described with respect to FIG. 1-7, IR system queries related to the network and/or the query from the user. In some cases, an exemplary IR system may be an internet search engine thereby providing the computing system with a vast well of knowledge to draw from. In this example, information responsive to the IR system queries may pertain to minimizing latency in a particular network configuration, hardware elements that may affect network throughput, modern network protocols, other information related to network issues identified by the language model (e.g., not including network latency), etc. The responsive information may be processed by the computing system and input to the language model to further supplement the contextual understanding of the language model before responses are generated. Based on the input data and the responsive information the language model may generate one or more responses that: detail the network in question, identify potential issues with the network, identify potential sources of the issues, etc. The computing system may then process the one or more responses and display the response for the user.

As another example, upon identifying the networks throughput is unnecessarily limited, or upon identifying another issue with the network. The user may input, to the computing system, a query pertaining to remedying the network issues. Based upon the input data (e.g., user query, retrieved information, etc.) the computing system, using the exemplary language models, may generate one or more recommended troubleshooting steps for the network.

Exemplary Automated Cross Platform Support

Figure 8:
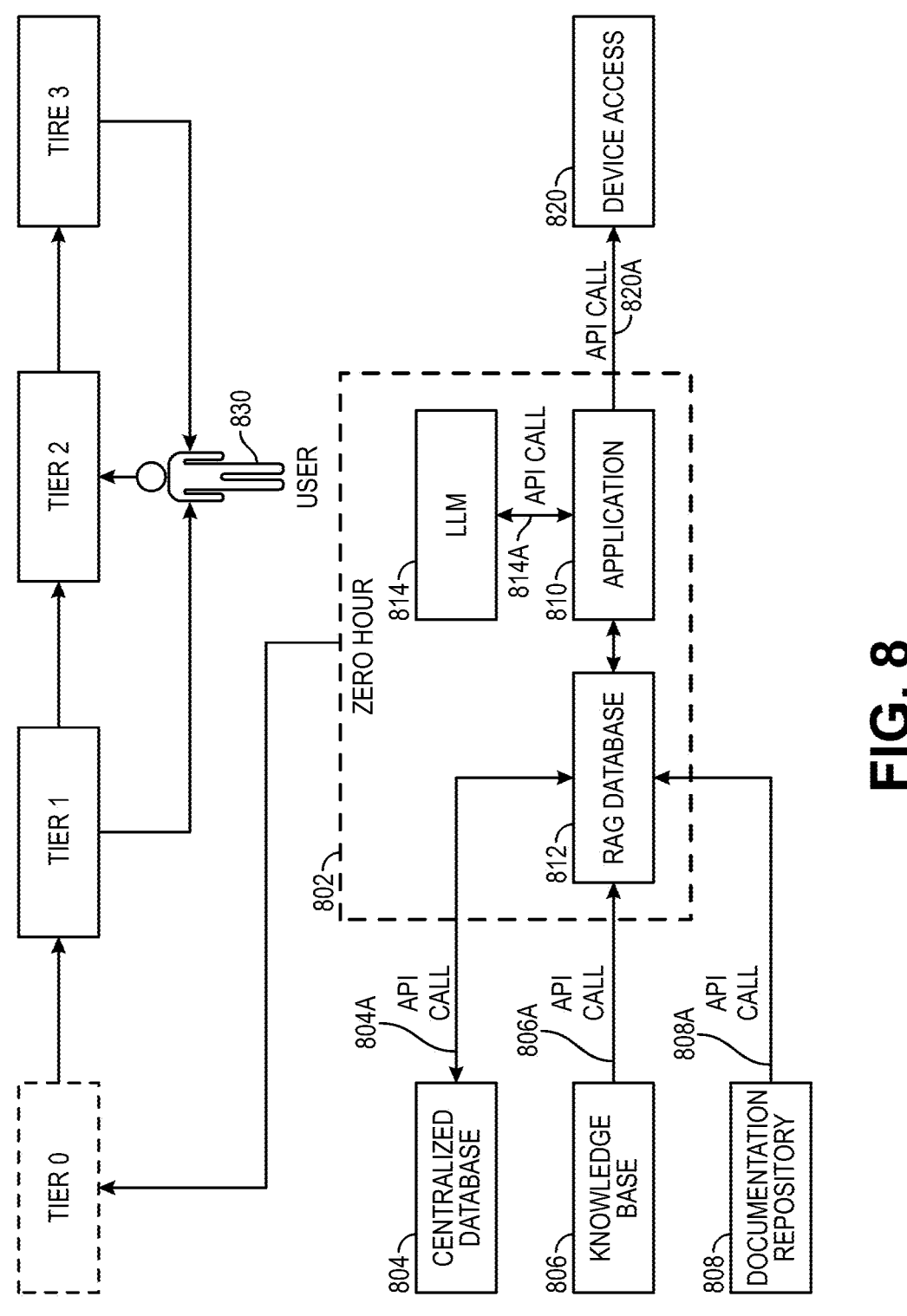
FIG. 8 depicts an exemplary block flow diagram for automated cross platform support and automated error resolution.

FIG. 8 depicts an exemplary block flow diagram 800 for automated cross platform support and automated error resolution.

The block flow diagram 800 includes an automated error resolution (AER) module 802, a centralized database 804, a knowledge base 806, and a documentation repository 808. The AER module 802 (or zeroHour application) may include an automated error resolution (AER) application 810, a retrieval augmented generation (RAG) database 812, and a large language model (LLM) 814 (e.g., language model 142 of FIG. 1, language model 204 of FIG. 2, cross platform support assistant 601 of FIG. 6, and/or language model 702 of FIG. 7).

The RAG database 812 (e.g., database 110 of FIG. 1) may be communicatively coupled to the AER application 810. The RAG database 812 may communicatively interface with the centralized database 804 (e.g., a centralized database storing electronic objects, such as an electronic ticketing system), via an API call (line 804a; e.g., via troubleshooting APIs 180 of FIG. 1), such that the RAG database 812 can obtain electronic objects (e.g., an electronic trouble ticket), or information/data related to electronic objects stored on the centralized database 804, from the centralized database 804 and provide information/data to the centralized database 804. Additionally, the RAG database 812 may be populated with information/data from the knowledge base 806, via an API call (line 806a; e.g., via troubleshooting APIs 180 of FIG. 1), and the RAG database 812 may obtain documents and other data from the documentation repository 808, via an API call (line 808a; e.g., via troubleshooting APIs 180 of FIG. 1).

Generally, the AER application 810 (e.g., AER application 152 of FIG. 1) may access remote devices (block 820; e.g., device(s) 104 of FIG. 1) to detect an exception/failure state of one or more remote devices by monitoring log files and/or device states directly, the AER application 810 may access the remote devices via an API call (line 820a; e.g., via troubleshooting APIs 180 of FIG. 1). Additionally, the AER application 810 may communicate with the LLM 814, via an API call (line 814a; e.g., via troubleshooting APIs 180 of FIG. 1). For instance, the AER application 810 may provide log files, device states, and/or data from the RAG database 812 to the LLM 814.

Based on an electronic object from the centralized database 804, the AER application 810 may perform a semantic search in the RAG database 812. The AER application 810 may then query the LLM 814 with the data returned from the RAG database 812 to perform a preliminary analysis on the electronic object (via the LLM 814). The AER application 810 may then access/interface with a remote device(s) (e.g., block 820; and via an API call), to obtain log files and/or device states to detect an exception/failure state of the remote device(s). Based on the electronic object and the detected exception/failure state, the LLM 814 and/or the AER application 810 may construe whether the electronic object corresponds to the detected exception/failure state of the remote device. The LLM 814 may then determine a fix for the exception/failure state and generate configuration data/code (e.g., troubleshooting steps/commands) that will be run on the remote device to effect a repair/change that causes the failing remote device to transition into a non-fail state. The AER application 810 may then cause the remote device to execute the configuration code/data generated by the LLM 814. Based on additional log files and/or device states obtained (e.g., via an API call) by the AER application 810 from the remote device, the AER application 810 and/or the LLM 814 may determine whether the device has transitioned into a different state. The AER application 810 may then update the electronic object to reflect the different state of the remote device. In some embodiments, the electronic object may also be updated with suggested next steps and/or associated documentation (e.g., from the documentation repository). The updated electronic object may be populated into the RAG database 812 to supplement or provide additional context for continuous learning.

The block flow diagram 800 additionally depicts 4 issue tiers (Tier 0, Tier 1, Tier 2, and Tier 3) and a user 830. Generally, the AER module 802 operates within Tier 0, while more complex issues (Tier 1, Tier 2, and Tier 3) are handled by the user 830. However, in some embodiments, the AER module 802 may be tasked with addressing issues that fall within any of Tiers 0-3. Moreover, all electronic objects from the centralized database 804 may first be analyzed/handled by the AER module 802, and upon a determination that the remote device experiencing an issue has not transitioned to a success/active state the user 830 may be tasked with resolving the issue (e.g., using the tools/interfaces depicted in FIG. 3A and FIG. 3B).

Aspects

The various embodiments described above can be combined to provide further embodiments. All U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

Aspects of the techniques described in the present disclosure may include any of the following aspects, either alone or in combination:

1. A computing system for cross-platform support and log summarization comprising: a language model configured to generate information retrieval (IR) system queries and recommended troubleshooting steps for a plurality of networks and respective network configurations; one or more application programming interfaces (API) communicatively interfacing the language model and an IR system and configured to obtain responsive files from the IR system using the IR system queries from the language model; one or more processors; one or more memories having stored thereon computer executable instructions that, when executed by the one or more processors, cause the computing system to: obtain, by an API and from a plurality of devices, a plurality of log files associated with a network and a respective network configuration; input, to the language model, the plurality of log files; generate, by the language model, one or more recommended IR system queries for each log file; input, to the language model and by an API, IR system results associated with the IR system queries for each log file; and generate, by the language model, one or more recommended troubleshooting steps based on the plurality of log files and the IR system results.

2. The computing system of aspect 1, further comprising: a computer vision application programming interface (API).

3. The computing system of any of aspects 1-2, including further computer executable instructions that, when executed by the one or more processors, cause the computing system to: analyze, by the computer vision API, one or more network topology diagrams associated with the respective network configuration; and generate, by the computer vision API, a summary for each network topology diagram.

4. The computing system of any of aspects 1-3, further comprising instructions that, when executed by the one or more processors, cause the computing system to: input, to the language model and with the plurality of log files, the summary for each network topology diagram.

5. The computing system of any of aspects 1-4, wherein the plurality of log files are obtained in response to user input and wherein the user input data includes one or more questions about the network.

6. The computing system of any of aspects 1-5, wherein the user input data includes the one or more network topology diagrams.

7. The computing system of any of aspects 1-6, further comprising instructions that, when executed by the one or more processors, cause the computing system to: input, to the language model and with the plurality of log files, additional network data including active device states and network interface configurations.

8. The computing system of any of aspects 1-7, wherein the one or more API obtains the IR system results from: (i) a search engine, or (ii) a database of the computing system utilizing query-driven retrieval.

9. A computer-implemented method for cross-platform support and log summarization, the method comprising: obtaining, by an API and from a plurality of devices, a plurality of log files associated with a network and a respective network configuration; inputting, to a language model, the plurality of log files; generating, by the language model, one or more recommended IR system queries for each log file; inputting, to the language model and by an API, IR system results associated with the IR system queries for each log file; and generating, by the language model, one or more recommended troubleshooting steps based on the plurality of log files and the IR system results.

10. The method of aspect 9, further comprising: analyze, by a computer vision API, one or more network topology diagrams associated with the respective network configuration; and generate, by the computer vision API, a summary for each network topology diagram.

11. The method of any of aspects 9-10, further comprising: inputting, to the language model and with the plurality of log files, the summary for each network topology diagram.

12. The method of any of aspects 9-11, wherein the plurality of log files are obtained in response to user input and wherein the user input data includes one or more questions about the network.

13. The method of any of aspects 9-12, further comprising: inputting, to the language model and with the plurality of log files, additional network data including active device states and network interface configurations.

14. The method of any of aspects 9-13, wherein the one or more API obtains the IR system results from: (i) a search engine, or (ii) a database of the computing system utilizing query-driven retrieval.

15. A non-transitory computer readable medium containing program instructions that when executed by one or more processors, cause a computer to: obtain, by an API and from a plurality of devices, a plurality of log files associated with a network and a respective network configuration; input, to a language model, the plurality of log files; generate, by the language model, one or more recommended IR system queries for each log file; input, to the language model and by an API, IR system results associated with the IR system queries for each log file; and generate, by the language model, one or more recommended troubleshooting steps based on the plurality of log files and the IR system results.

16. The non-transitory computer readable medium of aspect 15, including further instructions that, when executed by the one or more processors, cause a computer to: analyze, by a computer vision API, one or more network topology diagrams associated with the respective network configuration; and generate, by the computer vision API, a summary for each network topology diagram.

17. The non-transitory computer readable medium of any of aspects 15-16, including further instructions that, when executed by the one or more processors, cause a computer to: input, to the language model and with the plurality of log files, the summary for each network topology diagram.

18. The non-transitory computer readable medium of any of aspects 15-17, wherein the plurality of log files are obtained in response to user input and wherein the user input data includes one or more questions about the network.

19. The non-transitory computer readable medium of any of aspects 15-18, wherein the user input data includes the one or more network topology diagrams.

20. The non-transitory computer readable medium of any of aspects 15-19, including further instructions that, when executed by the one or more processors, cause a computer to: input, to the language model and with each respective log, additional network data including active device states and network interface configurations.

Additional Considerations

The following considerations also apply to the foregoing discussion. Although the following text sets forth a detailed description of numerous different aspects, it should be understood that the legal scope of the invention may be defined by the words of the claims set forth at the end of this patent. The detailed description is to be construed as exemplary only and does not describe every possible aspect, as describing every possible aspect would be impractical, if not impossible. One could implement numerous alternate aspects, using either current technology or technology developed after the filing date of this patent, which would still fall within the scope of the claims.

Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computing system for cross-platform support and log summarization comprising:
   a language model configured to generate information retrieval (IR) system queries and recommended troubleshooting steps for a plurality of networks and respective network configurations;
   one or more application programming interfaces (API) communicatively interfacing the language model and an IR system and configured to obtain responsive files from the IR system using one or more IR system queries from the language model;
   one or more processors; and
   one or more memories having stored thereon computer executable instructions that, when executed by the one or more processors, cause the computing system to:
   obtain, by an API and from a plurality of devices, a plurality of log files associated with a network and a respective network configuration;
   input, to the language model, the plurality of log files;
   generate, by the language model, one or more recommended IR system queries for each log file;
   input, to the language model and by an API, IR system results associated with the IR system queries for each log file;
   generate, by the language model, one or more recommended troubleshooting steps based on the plurality of log files and the IR system results;
   generate, by a computer vision API, a summary for each of one or more network topology diagrams associated with the respective network configuration; and
   input, to the language model and with the plurality of log files, the summary.

2. The computing system of claim 1, wherein the plurality of log files are obtained in response to user input and wherein the user input includes one or more questions about the network.

3. The computing system of claim 2, wherein the user input includes the one or more network topology diagrams.

4. The computing system of claim 1, further comprising instructions that, when executed by the one or more processors, cause the computing system to:
   input, to the language model and with the plurality of log files, additional network data including active device states and network interface configurations.

5. The computing system of claim 1, wherein the one or more API obtains the IR system results from: (i) a search engine, or (ii) a database of the computing system utilizing query-driven retrieval.

6. A computer-implemented method for cross-platform support and log summarization, comprising:

obtaining, by an application programming interface (API) communicatively interfacing a language model configured to generate information retrieval (IR) system queries and recommended troubleshooting steps for a plurality of networks and respective network configurations, and an IR system,
   wherein the API is configured to obtain responsive files from the IR system using one or more IR system queries from the language model, and from a plurality of devices, a plurality of log files associated with a network and a respective network configuration;
inputting, to the language model, the plurality of log files;
generating, by the language model, one or more recommended IR system queries for each log file;
inputting, to the language model and by an API, IR system results associated with one or more IR system queries for each log file;
generating, by the language model, one or more recommended troubleshooting steps based on the plurality of log files and the IR system results;
generating, by a computer vision API, a summary for each of one or more network topology diagrams associated with the respective network configuration; and
inputting, to the language model and with the plurality of log files, the summary.

7. The computer-implemented method of claim 6, wherein the plurality of log files are obtained in response to user input and wherein the user input includes one or more questions about the network.

8. The computer-implemented method of claim 6, further comprising:
   inputting, to the language model and with the plurality of log files, additional network data including active device states and network interface configurations.

9. The computer-implemented method of claim 6, wherein the one or more API obtains the IR system results from: (i) a search engine, or (ii) a database utilizing query-driven retrieval.

10. A non-transitory computer readable medium containing program instructions that when executed by one or more processors, cause a computer to:
   obtain, by an application programming interface (API) communicatively interfacing a language model configured to generate information retrieval (IR) system queries and recommended troubleshooting steps for a plurality of networks and respective network configurations, and an IR system,
      wherein the API is configured to obtain responsive files from the IR system using one or more IR system queries from the language model, and from a plurality of devices, a plurality of log files associated with a network and a respective network configuration;
   input, to the language model, the plurality of log files;
   generate, by the language model, one or more recommended IR system queries for each log file;
   input, to the language model and by an API, IR system results associated with one or more IR system queries for each log file;
   generate, by the language model, one or more recommended troubleshooting steps based on the plurality of log files and the IR system results;
   generate, by a computer vision API, a summary for each of one or more network topology diagrams associated with the respective network configuration; and input, to the language model and with the plurality of log files, the summary.

11. The non-transitory computer readable medium of claim 10, wherein the plurality of log files are obtained in response to user input and wherein the user input includes one or more questions about the network.

12. The non-transitory computer readable medium of claim 11, wherein the user input includes the one or more network topology diagrams.

13. The non-transitory computer readable medium of claim 10, including further instructions that, when executed by the one or more processors, cause a computer to:

input, to the language model and with each respective log, additional network data including active device states and network interface configurations.

* * * * *